United States Patent
Willson et al.

(10) Patent No.: US 12,045,232 B2
(45) Date of Patent: Jul. 23, 2024

(54) PRECONDITIONING TIME-SERIES DATA FOR IMPROVED EFFICIENCY

(71) Applicant: The Boeing Company, Chicago, IL (US)

(72) Inventors: Ian Alexander Willson, Seattle, WA (US); Lam Thanh Tran, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 93 days.

(21) Appl. No.: 17/648,334

(22) Filed: Jan. 19, 2022

(65) Prior Publication Data

US 2022/0245145 A1    Aug. 4, 2022

Related U.S. Application Data

(60) Provisional application No. 63/145,383, filed on Feb. 3, 2021.

(51) Int. Cl.
*G06F 16/2453* (2019.01)
*G06F 16/27* (2019.01)
*G06K 7/10* (2006.01)

(52) U.S. Cl.
CPC ........ *G06F 16/24532* (2019.01); *G06F 16/27* (2019.01); *G06K 7/10366* (2013.01)

(58) Field of Classification Search
CPC .............. G06F 16/24532; G06F 16/27; G06K 7/10366
USPC ....................................................... 707/610
See application file for complete search history.

(56) References Cited

U.S. PATENT DOCUMENTS

| 8,271,430 | B2 | 9/2012 | Willson |
| 8,688,622 | B2 | 4/2014 | Willson |
| 10,417,251 | B2 | 9/2019 | Willson et al. |
| 2007/0266782 | A1 | 11/2007 | Bartz et al. |
| 2015/0112883 | A1 | 4/2015 | Orduna et al. |
| 2016/0125083 | A1 | 5/2016 | Dou et al. |
| 2016/0162543 | A1 | 6/2016 | Gustafson et al. |
| 2017/0018125 | A1 | 1/2017 | Jover et al. |
| 2018/0134372 | A1 | 5/2018 | Kanistras et al. |

(Continued)

OTHER PUBLICATIONS

Willson, I., "IoT @ Boeing: From Flight Data Recorders to Factory RFID Analytics," Proceedings of XLDB 2018, May 1, 2018, Stanford University, 10 pages.

(Continued)

*Primary Examiner* — Robert W Beausoliel, Jr.
*Assistant Examiner* — Lauren Zannah Ganger
(74) *Attorney, Agent, or Firm* — Alleman Hall & Tuttle LLP

(57) ABSTRACT

A method of preconditioning time-series data for improved efficiency. The method includes repeatedly recognizing new time series entries for each of a plurality of tracked entities. For each of the plurality of tracked entities, a new time-series data entry for the tracked entity is promoted responsive to the new time-series data entry including a changed value in a normalized field. However, a previous time-series data entry for the tracked entity is maintained responsive to the new time-series data entry including an unchanged value in the normalized field. The method further incudes generating a synthetic time-series data entry for every tracked entity without a time-series data entry in a fixed time period.

20 Claims, 9 Drawing Sheets

(56) References Cited

U.S. PATENT DOCUMENTS

| | | | |
|---|---|---|---|
| 2018/0307727 A1 | 10/2018 | Lucas et al. | |
| 2018/0330293 A1* | 11/2018 | Kulkarni | G06K 7/10366 |
| 2020/0278660 A1 | 9/2020 | Virk | |
| 2020/0322703 A1* | 10/2020 | Bures | G06N 20/00 |
| 2020/0409966 A1 | 12/2020 | Willson | |

OTHER PUBLICATIONS

Willson, I., "Real-time Data Fusion at Scale for Aircraft Manufacturing," Proceedings of EE392b: Industrial AI, Apr. 30, 2019, Stanford University, 1 page.

* cited by examiner

FIG. 3

| ID | TIME OBSERVED | LOCATION | ••• | TIME SYNTHESIZED |
|---|---|---|---|---|
| 000000A0 | 20200602131730 | F20R95S32 | ••• | 20200602131730 |
| 110111A0 | 20200602131802 | F42R42S42 | ••• | 20200602131802 |
| 101011A1 | 20200602131829 | F88R07S12 | ••• | 20200602131829 |
| 0000000A0 | 20200602131831 | F20R95S33 | ••• | 20200602131831 |

FIG. 4A

401 — READ AN ID VALUE UNIQUE TO A TRACKED ENTITY FROM AN OBSERVABLE ASPECT OF THE TRACKED ENTITY

403 — OUTPUT A NEW TIME-SERIES DATA ENTRY FOR THE TRACKED ENTITY INCLUDING THE ID VALUE, A LOCATION VALUE CORRESPONDING TO A SENSOR LOCATION OF THE SENSOR READING THE OBSERVABLE ASPECT, AND A TIME-OBSERVED VALUE CORRESPONDING TO AN OBSERVATION TIME AT WHICH THE SENSOR READS THE OBSERVABLE ASPECT

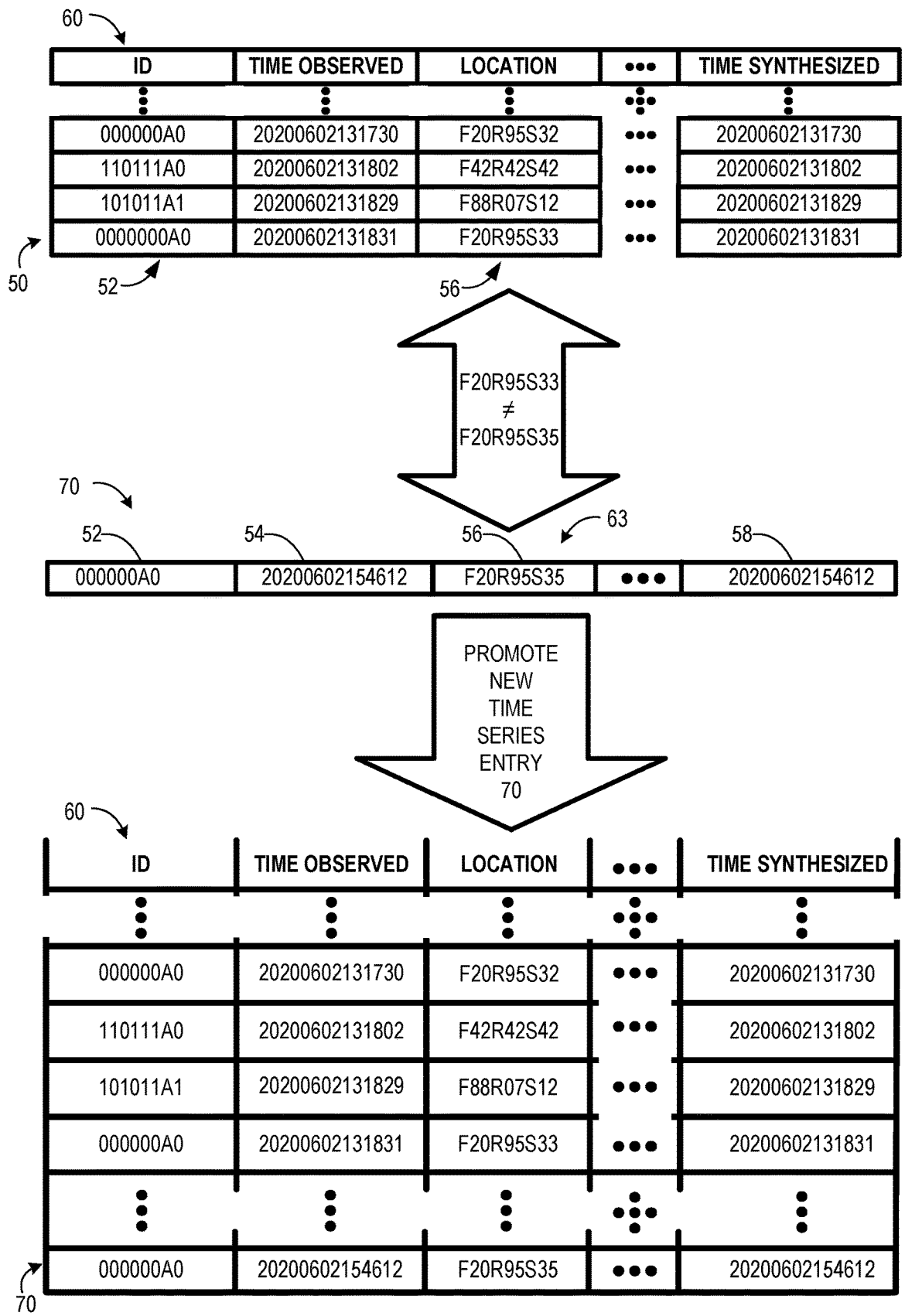

FIG. 8
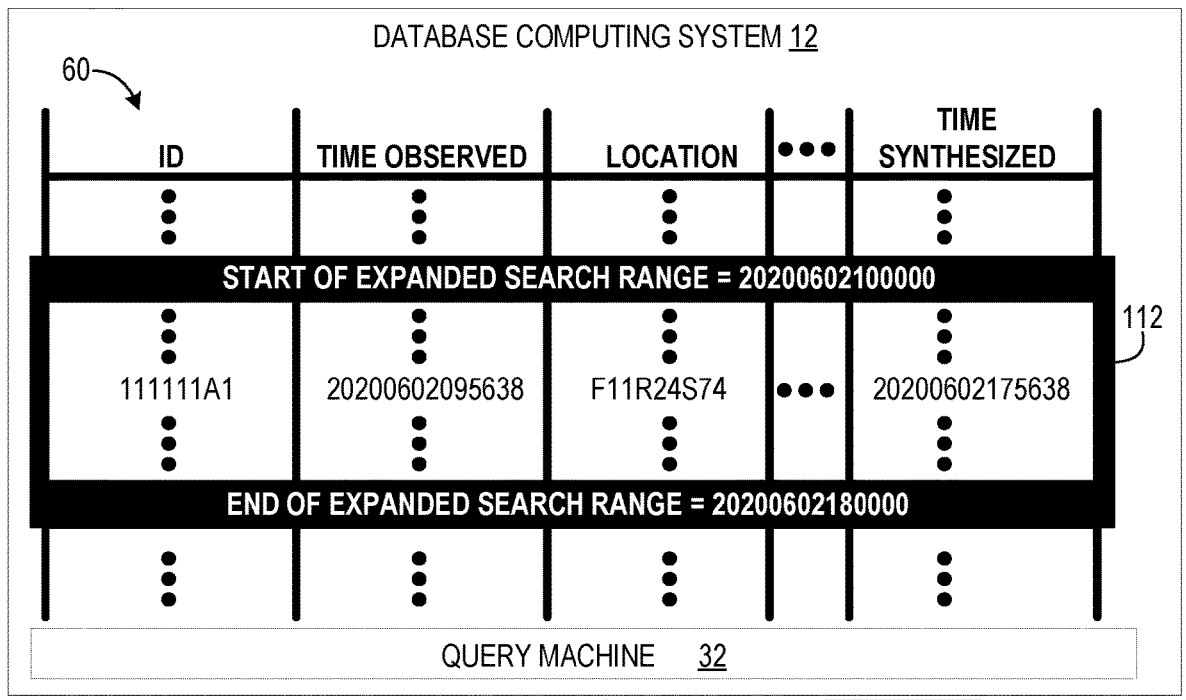
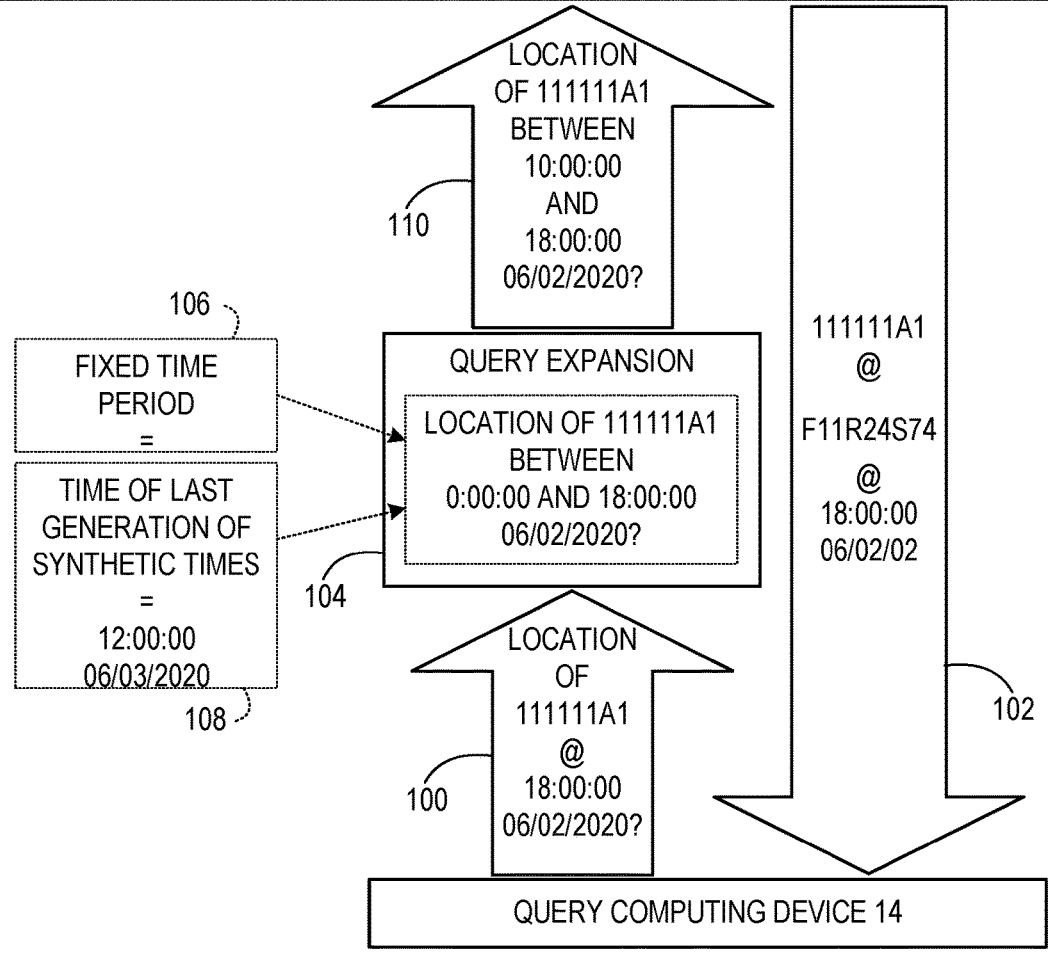

PRECONDITIONING TIME-SERIES DATA FOR IMPROVED EFFICIENCY

CROSS REFERENCE TO RELATED APPLICATIONS

This application claims priority to U.S. Provisional Patent Application Ser. No. 63/145,383, filed Feb. 3, 2021, the entirety of which is hereby incorporated herein by reference for all purposes.

FIELD

This invention relates generally to database management, and more specifically, to efficiency-improving data preconditioning.

BACKGROUND

Databases may be used to save massive amounts of data. Some databases are used to save time-series data, in which different parameters of interest are tracked over time. For example, the location of an aircraft wing part may be tracked over time as the aircraft wing part is moved from place to place during aircraft manufacture. Tracking a large number of entities at frequent intervals can produce very large databases. The massive size of the databases can make efficient data storage, data transmission, and data query difficult.

SUMMARY

To address the above issues, according to one aspect of the present disclosure, a method of preconditioning time-series data improves efficiency by repeatedly recognizing new time series entries for each of a plurality of tracked entities. For each of the plurality of tracked entities, a new time-series data entry for the tracked entity is promoted responsive to the new time-series data entry including a changed value in a normalized field. However, a previous time-series data entry for the tracked entity is maintained responsive to the new time-series data entry including an unchanged value in the normalized field. The method further includes generating a synthetic time-series data entry for every tracked entity without a time-series data entry in a fixed time period.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 3 shows a portion of a table holding time-series data.
FIG. 4A shows a method for reporting time-series data for a tracked entity.
FIG. 5 shows promotion of a time-series data entry.
FIG. 8 shows a query operation utilizing query expansion.

DETAILED DESCRIPTION

Figure 1:
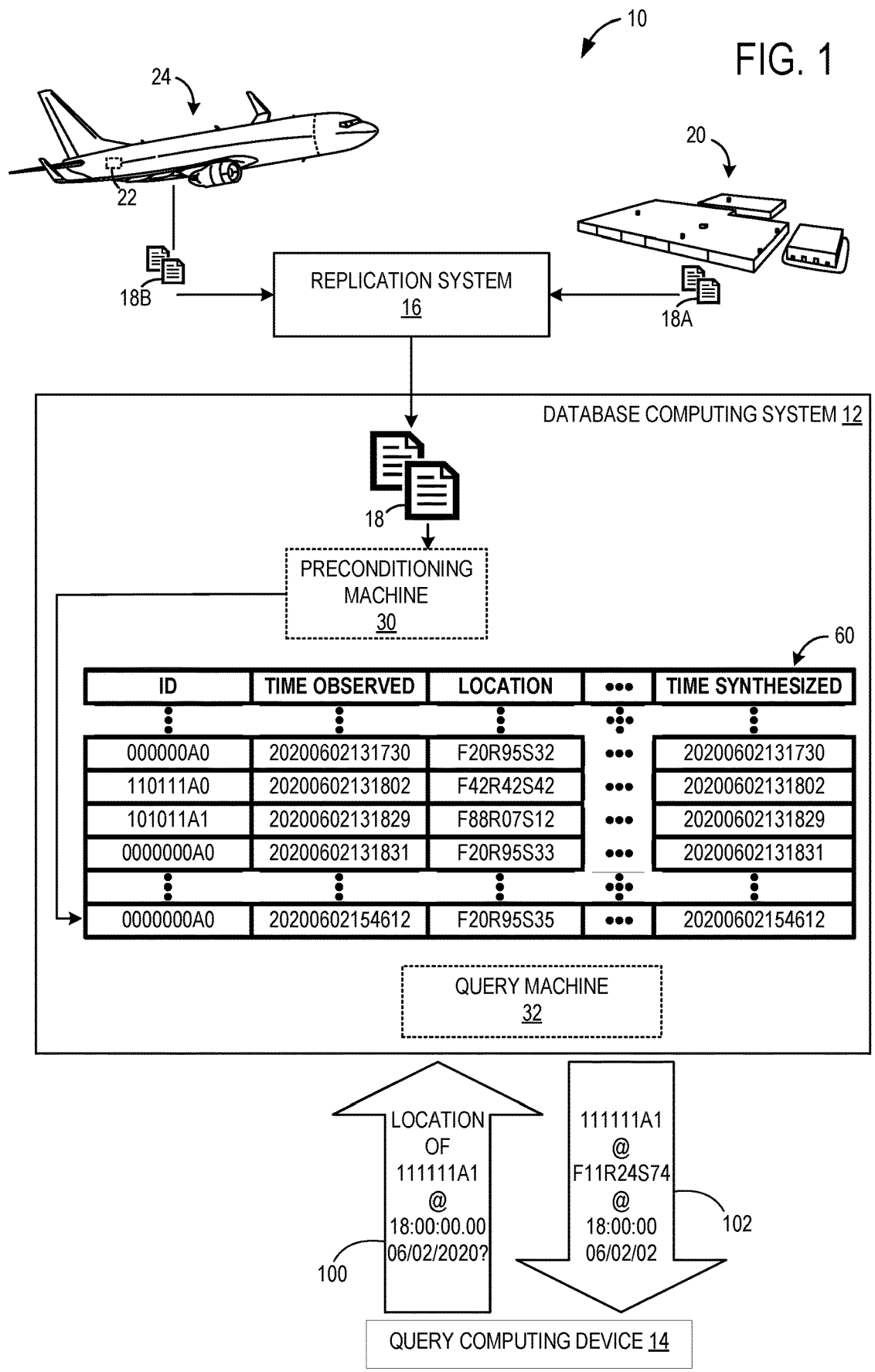
FIG. 1 schematically shows an entity tracking system for handling time-series data.

FIG. 1 shows a schematic diagram of an example entity tracking system 10 according to the present disclosure. The entity tracking system 10 includes a database computing system 12, a query computing device 14, and a replication system 16. The database computing system 12 may include massively parallel processing (MPP) architecture, for example.

The replication system 16 receives time-series data 18 from one or more data sources. For example, a data source may be one or more sensors outputting sensor data 18A at an aircraft factory 20. In another example, a data source may be a flight data recorder (FDR) 22 comprising a plurality of sensors that produce flight data 18B or any other data recorded from an aircraft 24. The replication system 16 streams the data 18 to the database computing system 12. Other replication systems, or other methods of delivering time-series data, may be used. In some implementations, data sources (e.g., sensors or sensor systems) may include integrated replication systems or other systems for delivering time-series data 18 to database computing system 12. Such time-series data reporting is described in more detail below with referent to FIG. 4A.

Entity tracking system 10 includes a database preconditioning machine 30. As described in detail below with reference to FIG. 4B, the database preconditioning machine 30 is configured to normalize data as the data is supplied to the database computing system 12 (i.e., on-the-fly preconditioning) and/or normalize data retrospectively in a batch after the data has been supplied to the database computing system 12 (i.e., retrospective batch preconditioning). Furthermore, database preconditioning machine 30 is configured to intelligently synthesize data to improve query efficiency.

While database preconditioning machine 30 and database query machine 32 are illustrated as being component parts of database computing system 12, this is in no way limiting. One or both of the database preconditioning machine 30 and the database query machine 32 instead may be components of a network-accessible preconditioning service and/or integrated into replication system 16.

Entity tracking system 10 includes a database query machine 32 configured to efficiently answer database queries. As described in detail below with reference to FIG. 4B, the database query machine must leverage knowledge of synthetic data generation to accurately filter search queries and efficiently return query results.

Figure 2:
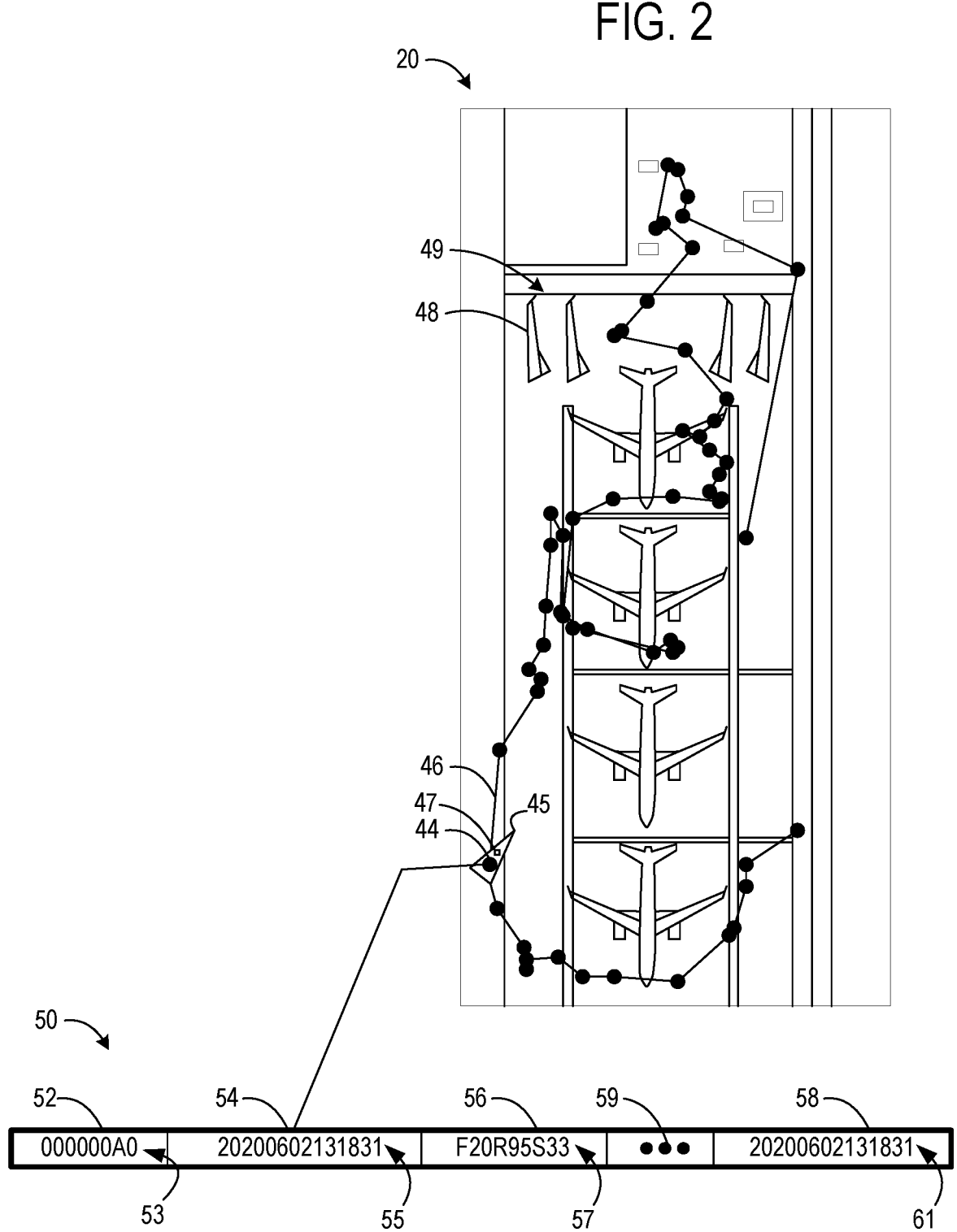
FIG. 2 schematically shows collection of time-series data.

FIG. 2 schematically shows a nonlimiting example of the collection of time-series data. Specifically, FIG. 2 depicts an aircraft factory 20 by way of example. In FIG. 2, an observable aspect 44 of a tracked entity 45 is tracked by a sensor observing the observable aspect 44 as the tracked entity 45 is moved along a path 46. Tracked entity 45 may be one of a plurality of tracked entities 49 that may be tracked by entity tracking system 10 (shown in FIG. 1) While only one observable aspect 44 in one factory 20 is shown for ease of viewing, it will be appreciated that virtually any number of different, uniquely identifiable, observable aspects may be tracked in virtually any number of different, uniquely identifiable, environments. As one example, aircraft parts 48 may be tagged with uniquely identifiable observable aspects, such that a location of each such part may be tracked for any given time period during aircraft assembly. Tracked entity 45 is an example of one such aircraft part.

In some examples, Radio Frequency Identification (RFID) aspects may be used as the observable aspects. As one example, active RFID transponders and/or beacons may be configured to actively report information useable to determine location. For example, in FIG. 2 an active RFID sensor 47 positioned on the tracked entity 45 may report its location as the tracked entity 45 moves along the path 46. As another example, passive RFID tags may be scanned by mobile scanners or at set locations, and the location of the scanners at the time of the scans may be used to determine the locations of the scanned tags. In other examples, bar codes, QR codes, digital watermarks, security circuits, digital fingerprints, and/or other observable aspects may be used.

Tagged items may include autonomous vehicles, machine parts for assembly, tools, and/or supply materials, as nonlimiting examples. While FIG. 2 uses aircraft manufacturing as an example scenario, it is to be understood that the herein disclosed data tracking, preconditioning, storage, and query techniques may be applied to myriad other scenarios.

As other examples, time-series data may include flight test data from one or more aircraft sensors during a flight test and/or service data from one or more service sensors during aircraft service. With reference to FIG. 1, in the flight test scenario, the flight test data 18B may be collected in the FDR 22, which can receive data from hundreds to thousands of sensors recording aircraft performance parameters. For example, the flight test data 18B may include attitude, six degrees of freedom (DoF) acceleration, atmospheric pressure and temperature, local atmospheric pressure and temperature of various components, throttle and other control instrument position, and/or virtually any other relevant data.

Returning to the example of FIG. 2, each time an observable aspect, such as an RFID aspect, is scanned or otherwise observed, a new time-series data entry 50 may be created. The number of different data fields and/or the types of different data fields is in no way limited. For simplicity, this description will focus on four different data fields: an ID field 52 for specifying an ID value 53 that identifies a tracked entity, a time-observed field 54 for specifying a time 55 at which the observable aspect is observed (e.g., time an RFID tag is scanned); a location field 56 for specifying a location 57 of the tracked entity at the time observable aspect is observed; and a synthesized time field 58 for specifying a time synthesized 61, as described in more detail below. While this description focusses on these four data fields, as indicated by ellipsis 59, a time-series data entry 50 may include any number (e.g., tens, hundreds, thousands, or more) of different data fields.

The observable aspect 44 may encode a uniquely identifiable identification (ID) value, and this value may be used to uniquely identify the tracked entity 45 to which the observable aspect 44 corresponds. For example, tracked entity 45 may be tagged with an observable aspect 44 (e.g., RFID aspect) encoding the value 000000A0, which may be saved in ID field 52 of time-series data entry 50. Any suitable data structure may be used to represent the ID value saved in the ID field 52. In some implementations, each observable aspect is assigned a unique ID value such that each tracked entity can be uniquely identified. In some scenarios, a master database may be used to map an ID value to a particular tracked entity.

The time the observable aspect is observed may be saved in time-observed field 54. For example, if observable aspect 44 is observed at 1:18 PM and 31 seconds on Jun. 2, 2020, the value 20200602131831 may be saved in time-observed field 54. Any suitable data structure may be used to represent the time-observed value saved in the time-observed field 54. In some implementations, the time-observed field may include a plurality of subfields (e.g., a date subfield and a time subfield; or a year subfield, a month subfield, a day subfield, an hour subfield, a minute subfield, and a second subfield). In other implementations, year, month, day, and/or other time components may be concatenated into a single number, string, or other data structure. The precision with which a time is saved is in no way limited. The time-observed value may be saved to minute accuracy, second accuracy, millisecond accuracy, or any other accuracy without departing from the scope of this description.

The absolute and/or relative location of the tracked entity may be determined when the observable aspect is observed, and this location may be saved in location field 56. For example, if observable aspect 44 is observed by a sensor in Factory #20, Room #95, and Station #33, the value F20R95S33 may be saved in location field 56. This location value corresponds to the sensor location of the sensor that observes observable aspect 44. In other words, the known location of the sensor may be used to determine the location of the observable aspect when the sensor observes the observable aspect. Any suitable data structure may be used to represent the location value saved in the location field. In some implementations, an absolute latitude/longitude value may be used. In other examples, an address, building number, floor number, room number, station number, and/or other value that can be mapped to an absolute or relative location may be used. In some implementations, the location field may include a plurality of subfields (e.g., a latitude subfield and a longitude subfield; or an address subfield, building subfield, floor subfield, room subfield, and station subfield). In other implementations, two or more different location components may be concatenated into a single number, string, or other data structure. The precision with which location is saved is in no way limited.

The location field 56 is a nonlimiting example of a normalized field. Each normalized field may hold corresponding normalized observed values (e.g., a location value). As described in more detail below, "normalization" is an efficiency-improving strategy that decreases the amount of redundant time-series data entries, and "normalized fields" are fields in which efficiency-improving normalization is applied. While location is used as an example, normalization can be applied to myriad different types of fields without departing from the spirit of this description. A time-series data entry 50 may include any number, including zero, of normalized fields.

Each time-series data entry (e.g., time-series data entry 50) may be collected in a database or other suitable collection. Returning briefly to FIG. 1, the time-series data entries may be saved at database computing system 12, as an example. For the sake of simplicity, this description will use the concept of a table to describe a collection of time-series data entries, where each row of the table represents a different time-series data entry, and each column of the table represents a different field. However, this convention is in no way limiting. The data may be saved in any suitable way without departing from the scope of this disclosure. FIG. 1 shows a small portion of an example table 60 as an example.

FIG. 3 shows table 60 in more detail. Table 60 schematically represents time-series data saved in a database computing system (e.g., database computing system 12 of FIG. 1). For the sake of simplicity, only the last four rows of time-series data entries are illustrated in FIG. 3. Also for the sake of simplicity, only four columns of fields are illustrated. However, the row and column ellipses indicate that table 60 can have any number of rows and/or columns. As introduced above, database computing system 12 need not save data in a table, such as table 60. Any database, data structure, and/or other data-saving paradigm is within the spirit of this description.

Because a database computing system may track a large number of different tracked entities (e.g., hundreds, thousands, millions, or more); and because any to all of those tracked entities can be repeatedly tracked (e.g., tens, hundreds, thousands, or more times per day), a database computing system may accumulate a huge number of different time-series data entries (e.g., millions, billions, trillions, or more). The massive scale of the time-series data can make the efficient storage, transmission, and/or query of such data very difficult. For example, finding the location of any particular tracked entity at any particular time in the past may be extremely, even prohibitively, computationally expensive, especially in useful implementations in which industry standard SQL databases capable of advanced analytics are employed in favor of purpose-built, time-series databases only capable of simple point in time lookups.

FIG. 4A shows an example method 400 for reporting time-series data for a tracked entity. Method 400 may be performed at least in part by a sensor (e.g., RFID sensor 47) and/or some intermediate reporting device (replication system 16), as nonlimiting examples. At 401, method 400 includes reading an ID value unique to a tracked entity from an observable aspect of the tracked entity. In some embodiments, the observable aspect may include a Radio Frequency Identification (RFID) aspect of the tracked entity. In some examples, the RFID aspect may include an active RFID sensor that broadcasts the unique ID value of the tracked entity. In other examples, the RFID aspect may include a passive RFID tag that includes the unique ID value of the tracked entity.

At 403, method 400 includes outputting a new time-series data entry for the tracked entity including the ID value, a location value corresponding to a sensor location of the sensor reading the observable aspect, and a time-observed value corresponding to an observation time at which the sensor reads the observable aspect. In some examples, the new time-series data entry may be output from a sensor directly to a database preconditioning machine (e.g., e.g., database preconditioning machine 30 of database computing system 12). In other examples, the new time-series data entry may be output from a sensor to an intermediate reporting device (replication system 16), and the intermediate reporting device may relay the new time-series data entry to the database preconditioning machine.

Figure 4B:
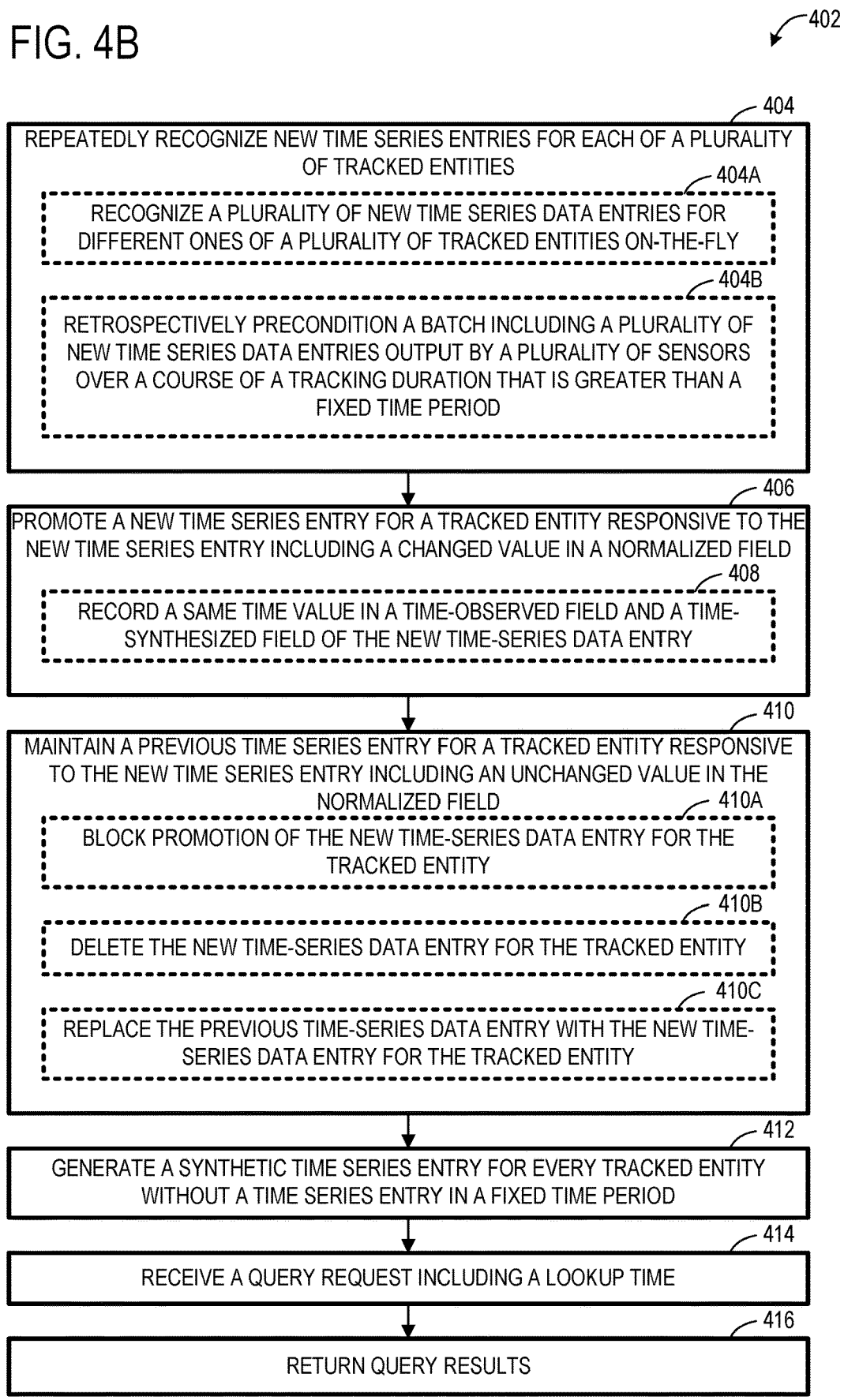
FIG. 4B shows a method for preconditioning and querying time-series data for improved efficiency.

FIG. 4B shows an example method 402 for preconditioning and querying time-series data for improved efficiency. Method 402 may be performed by a database preconditioning machine (e.g., e.g., database preconditioning machine 30 of database computing system 12), a database query machine (e.g., database query machine 32 of database computing system 12), a replication system (e.g., replication system 16), a dedicated data preconditioning computer, and/or a network-accessible data preconditioning service, as nonlimiting examples. The preconditioning and querying described herein may improve data storage efficiency, data transmission efficiency, and/or data query efficiency. While method 402 uses entity tracking as an example application, data preconditioning and querying can be used in any time-related bucketing application.

Data preconditioning consistent with method 402 may be performed essentially in real time as new time-series data entries are observed and/or saved. For example, each of a plurality of new time series entries for different tracked entities may be recognized on-the-fly (e.g., at or near the time the corresponding observable aspect is observed and/or the new time-series data entry is first delivered to the database computing system); and each new data entry may be preconditioned on-the-fly as each new time-series data entry is recognized. In some scenarios, a plurality of new time series entries for different ones of the plurality of tracked entities are recognized over a tracking duration, and these time series entries are retrospectively preconditioned as a batch. In other words, different entries may be accumulated over a tracking duration, and then at the end of the tracking duration, these entries may be preconditioned as a batch instead of preconditioning each data entry one-by-one on-the-fly.

At 404, method 402 includes repeatedly recognizing new time series entries for each of a plurality of tracked entities. In some examples, at 404A, method 402 may include recognizing the new time-series entries as the new time-series entries are created (i.e., on-the-fly). In other examples, at 404B, method 402 may include retrospectively preconditioning a batch of time-series data including a plurality of new time-series entries output by a plurality of sensors over a course of a tracking duration that is greater than a fixed time period. In other words, a new time-series data entry may be recognized any time after the new time-series data entry has been created (i.e., retrospectively as a batch). Using the example table paradigm of FIG. 3, each new time-series data entry may correspond to a row that can be added to table 60, for example.

At 406, method 402 includes promoting a new time-series data entry for the tracked entity responsive to the new time-series data entry including a changed value in a normalized field. For example, FIG. 5 illustrates a scenario in which a new time-series data entry 70 is recognized, either on-the-fly or retrospectively as part of a batch. Time-series data entry 70 includes an ID value of 000000A0 in the ID field 52, a time-observed value of 20200602154612 in the time-observed field 54, and a location value of F20R95S35 in the normalized location field 56. The identical ID value in time-series data entry 50 and time-series data entry 70 indicates that both entries correspond to the same tracked entity (e.g., tracked entity 45 of FIG. 2). For purposes of this scenario, time-series data entry 70 is the next entry corresponding to ID 000000A0 after time-series data entry 50. Because time-series data entry 70 includes a changed value 63 in the normalized location field 56 (i.e., F20R95S35 vs. F20R95S33), time-series data entry 70 is not redundant compared to time-series data entry 50. In other words, the tracked entity corresponding to ID value 000000A0 (e.g., tracked entity 45 of FIG. 2) has moved from location F20R95S33 at time 20200602131831 to location F20R95S35 at time 20200602154612. Because the location value has changed, there is value in keeping both rows of data so that the different locations at the different times will not be lost. As such, time-series data entry 70 is promoted. As used herein, promotion may include adding an on-the-fly recognized time-series data entry to a table or other database and/or keeping a retrospectively batch processed time-series data entry in a table or other database.

Returning briefly to FIG. 2, time-series data entry 50 includes a synthesized time field 58 for specifying a time synthesized. Likewise, time-series data entry 70 includes a synthesized time field 58 for specifying a time synthesized. In some implementations, a time-series data entry need not include a synthesized time field. When included, in situations where a new time-series data entry is promoted based on a new observation, the synthesized time field 58 may be populated with the same time-observed value saved in the time-observed field 54. Returning to FIG. 4B, in some examples, at 408, method 402 may include recording a same time value in a time-observed field and a time-synthesized field of a new time-series data entry. The time-observed field can additionally and/or alternatively be used to record a time a time-series data entry is synthesized.

Figure 6:
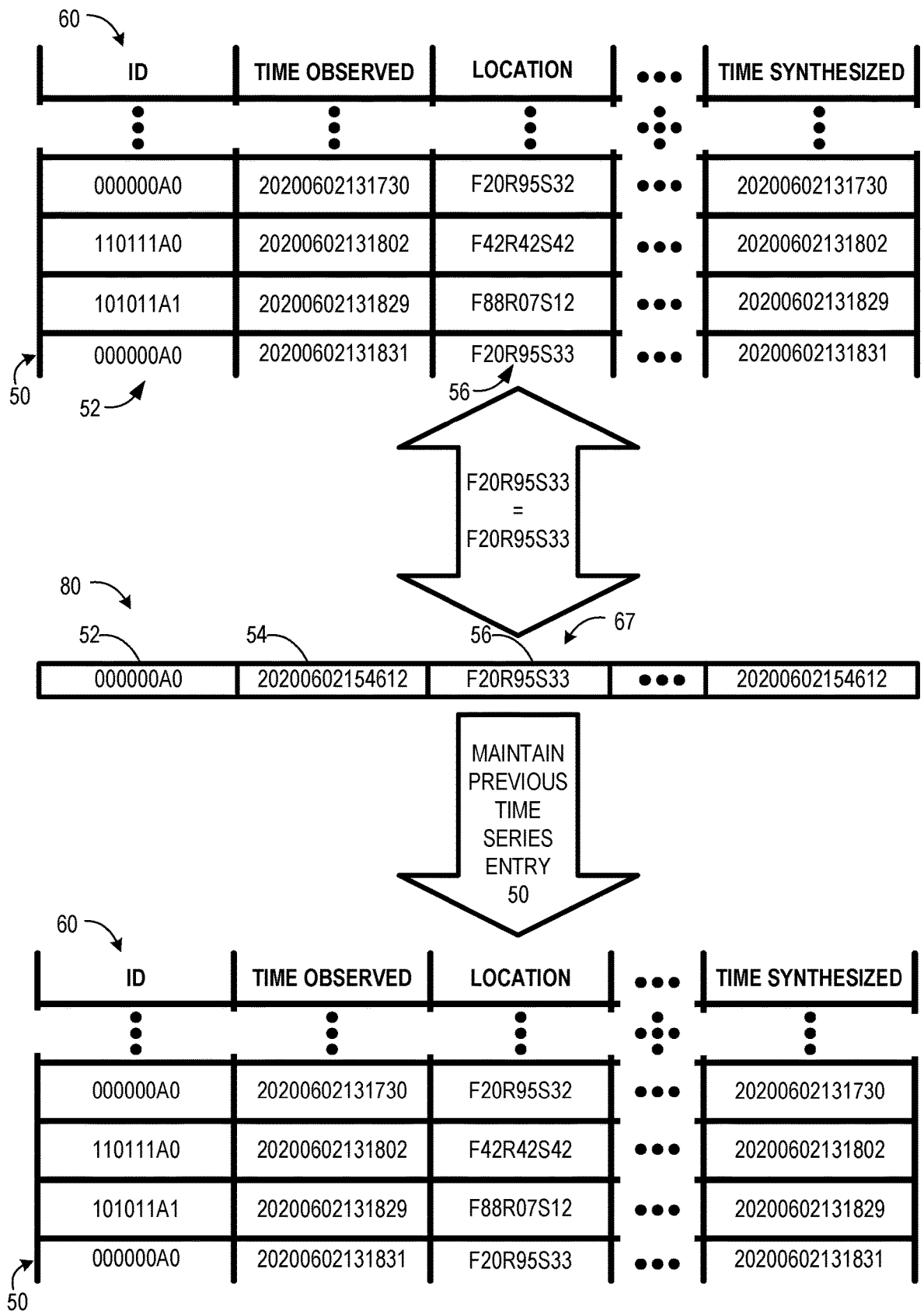
FIG. 6 shows a time-series data entry being maintained.

At 410 method 402 includes maintaining a previous time-series data entry for the tracked entity responsive to the new time-series data entry including an unchanged value in the normalized field. For example, FIG. 6 illustrates a scenario in which a new time-series data entry 80 is recognized, either on-the-fly or retrospectively as part of a batch. Time-series data entry 80 includes an ID value of 000000A0 in the ID field 52, a time-observed value of 20200602154612 in the time-observed field 54, and a location value of F20R95S33 in the normalized location field 56. The identical ID value in time-series data entry 50 and time-series data entry 80 indicates that both entries correspond to the same tracked entity (e.g., tracked entity 45 of FIG. 2). For purposes of this scenario, time-series data entry 80 is the next entry corresponding to ID 000000A0 after time-series data entry 50. Because time-series data entry 80 includes an unchanged value 67 in the normalized location field 56 (i.e., F20R95S33 vs. F20R95S33), time-series data entry 80 is redundant with respect to location compared to time-series data entry 50. In other words, the tracked entity corresponding to ID value 000000A0 (e.g., tracked entity 45 of FIG. 2) has not moved from location F20R95S33 from time 20200602131831 to time 20200602154612. Because the location value has not changed, both rows of data are redundant at least with respect to location. As such, previous time-series data entry 50 is maintained. In some examples, at 410A, maintaining the previous time-series data entry may include blocking promotion of the new time-series data entry for the tracked entity (e.g., not adding the new entry to the table). In other examples, at 410B, maintaining the previous time-series data entry may include deleting the new time-series data entry for the tracked entity (e.g., if batch processing a previously saved redundant entry). In still other examples, at 410C, maintaining the previous time-series data entry may include replacing the previous time-series data entry with the new time-series data entry for the tracked entity. In some implementations, a time-series data sensor may be configured to avoid sending a time-series data entry that has a same location as a previous time-series data entry sent by that time-series data sensor. In some implementations, the time-synthesized field may be set to the last time the tracked entity is observed at a particular location.

Steps 406 (including step 408) and 410 (including steps 410A-410C) of method 402 cooperatively normalize data and decrease the number of saved entries. Using the table example of FIGS. 3 and 5-6, this type of normalization decreases the number of rows in the table. For example, if a particular tracked entity is repeatedly observed at the same location, the table need only include one row of data for a given fixed period, as discussed below, as opposed to one row of data for each and every observation during that same fixed period. This normalization approach can drastically decrease the amount of stored data, thus decreasing the hardware requirements needed to save the data and drastically increasing the efficiency of searching through the data.

However, query latency remains a serious challenge. In many use cases, the time required to successfully query a normalized database, for example to find the location of a tracked entity at a particular time, could be prohibitively expensive. In particular, the time window in which such a search need be performed would be unknown and hence span up to the entire time-range of the database. The following data synthesis approach addresses this query inefficiency, drastically increasing query answer performance.

At 412 of FIG. 4B, method 402 includes generating a synthetic time-series data entry for every tracked entity without a time-series data entry in a fixed time period. The fixed time period, as used herein, refers to a time period that may be selected based on a particular application. As one nonlimiting example, in the context of tracking parts during aircraft manufacturing, the fixed time period may be set to eight hours. However, this is in no way limiting, and the fixed time period may be set to any duration without departing from the spirit of this description. In general, the fixed time period may be carefully selected to balance query and storage efficiency for a particular use case. In some implementations, the fixed time period may even be set to vary according to a fixed schedule. For example, the fixed time period may be shorter during manufacturing hours and/or manufacturing days (e.g., two hours), and longer during off hours (e.g., twelve hours). As described in more detail below, knowledge of the fixed time period must be used and can increase query efficiency drastically, so if the fixed time period is varied, a log of the fixed time period schedule must be kept and leveraged when submitting queries.

Figure 7:
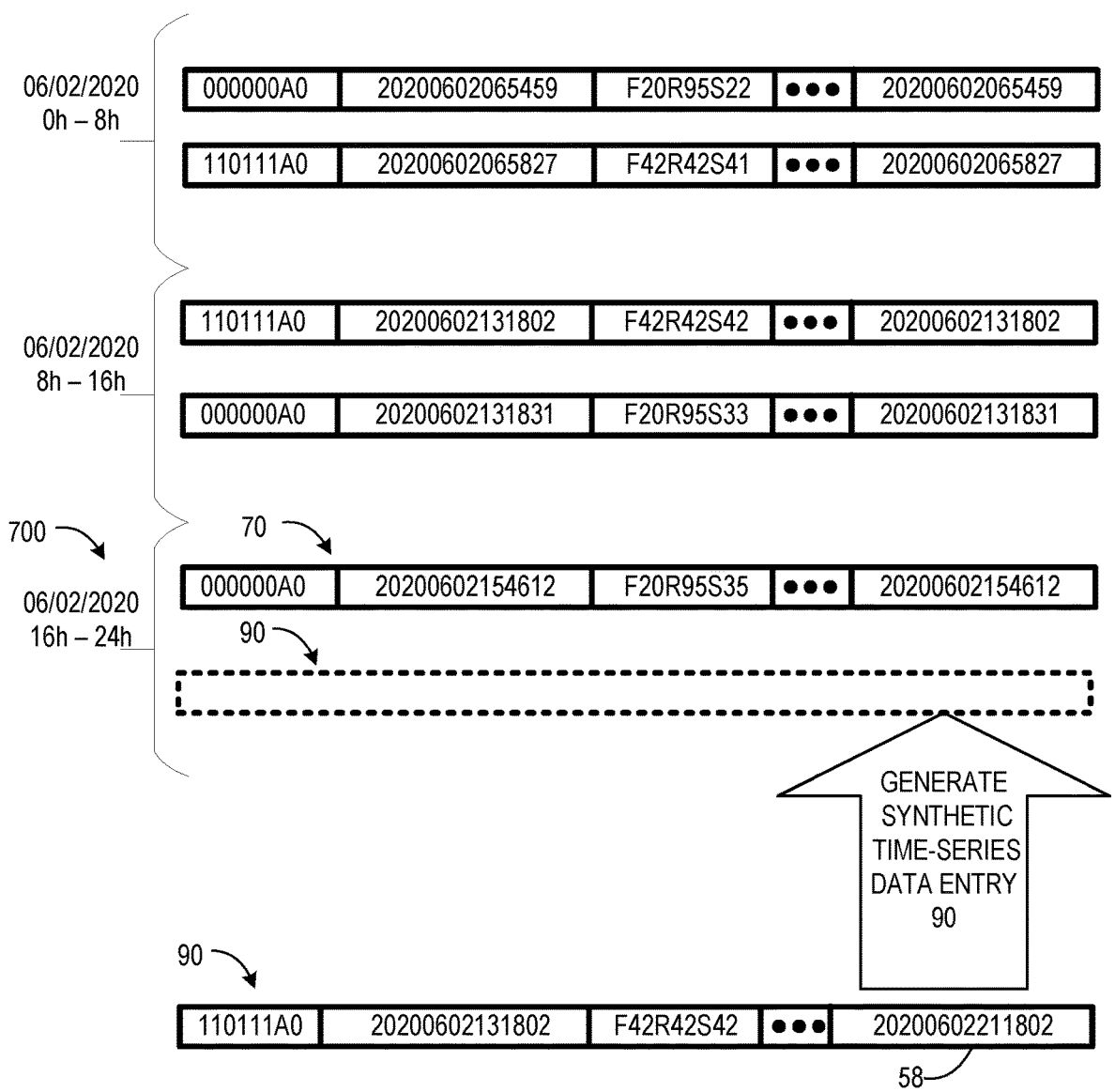
FIG. 7 shows generation of a synthetic time-series data entry.

Using the nonlimiting example of an eight hour fixed time period, all time-series data entries recorded during that eight hour period may be considered. If a tracked entity (i.e., identified by a particular ID value in an ID field) has one or more promoted and/or maintained entries within that eight hour period, no further action need be taken. For example, FIG. 7 shows an example in which the time period 700 between 16:00 and 23:59:59 is considered with respect to the tracked entity identified by ID 000000A0. Because the tracked entity identified by 000000A0 already has a recorded time-series data entry 70 in this time period, a time-series data entry is not synthesized for 000000A0 for this time period.

However, if a tracked entity (i.e., identified by a particular ID value in an ID field) does not have any time-series data entry recorded within that eight hour period, a synthesized time-series data entry is created. Using the example of FIG. 7, the time period 700 between 16:00 and 23:59:59 may also be considered with respect to the tracked entity identified by ID 110111A0. Because the tracked entity identified by 110111A0 does not have a recorded time-series data entry in this time period, a synthetic time-series data entry 90 is generated for 110111A0 for this time period.

In the illustrated example, a time-synthesized value is recorded in the time-synthesized field 58. The time that is used for the time-synthesized field may vary by implementation. In the illustrated example, the synthesized time is set the fixed time period (i.e., eight hours) after the synthesized time from the immediately previous recorded time-series data entry corresponding to the same ID 110111A0 (i.e., 13:18:02 on Jun. 2, 2020+8 h=21:18:02 on Jun. 2, 2020 or 20200602211802). In other implementations, the last time within the fixed time period may be used, i.e., 23:59:59 on Jun. 2, 2020 or 20200602235959. In still other implementations, the first time within the fixed time period may be used, i.e., 16:00:00 on Jun. 2, 2020 or 2020060216000000. In still other implementations, a time in the middle of the fixed time period may be used. In general, any suitable time within the fixed time period may be used provided that the query procedure, as described below, utilizes knowledge of which synthetic time is used and the fixed time period that is used.

In the illustrated example, the synthetic time-series data entry 90 copies the location value from the immediately previous recorded time-series data entry corresponding to the same ID 110111A0 (i.e., location value F42R42S42). As such, the synthetic time-series data entry accurately details the last observed location of the corresponding tracked entity. In the illustrated example, the synthetic time-series data entry 90 also copies the time-observed value from the immediately previous recorded time-series data entry corresponding to the same ID 110111A0 (i.e., time-observed value 202000602131802).

Step 412 of Method 402 may be repeated for every tracked entity and corresponding ID value. Doing so guarantees that every tracked entity will have at least one time-series data entry in every fixed time period. As a natural result, a query searching for a particular tracked entity (e.g., via the corresponding ID value) within any fixed time period is guaranteed to return at least one result for that tracked entity. While synthesizing time-series data entries in this manner does increase the storage requirements modestly, the decrease in storage efficiency is more than made up for with the increased query efficiency. Without synthetic time-series data entries, a query would have no guarantee that a search filtered to any particular period would return any results for a given ID value. However, with the synthetic generation provided by step 412 of method 402, the query is guaranteed to find at least one time-series data entry in each particular fixed period if the query is filtered to span at least the fixed period. As such, method 402 achieves the unexpected result of increasing query efficiency despite a slightly increased database size.

In some implementations, a database may be configured to automatically cycle step 412 of method 402 soon after a fixed time period elapses. In other implementations, two or more fixed time periods may elapse before the database cycles method step 412 of method 402 for each of the elapsed fixed time periods. In some implementations, the data normalization of steps 406 (including step 408) and 410 (including steps 410A-410C) of method 402 may be performed on the same schedule as the synthesis of step 412. In other words, the tracked duration discussed above with respect to batch processing may be equal to the fixed time period, and every time data from a fixed time period is checked for missing entries, the data previously stored for that fixed time period may also be batch processed to normalize and remove redundant entries. In other examples, the tracking duration may be greater than or less than the fixed time period.

Returning to FIG. 4B, at 414, method 402 includes receiving a query request including a lookup time. Turning briefly to FIG. 1, entity tracking system 10 may include a query computing device 14 that can be used to query, access, and/or analyze database computing system 12, as an example. Such queries may be processed by database query machine 32, as an example. In particular, FIG. 1 shows query computing device 14 submitting a query 100 asking for the location of the tracked entity identified by ID value 111111A1 at lookup time 18:00:00 on Jun. 2, 2020.

FIG. 8 shows query 100 in more detail. As discussed above, generation of synthesized time-series data entries guarantees that every tracked entity will have at least one time-series data entry in every bucket of time that spans at least one fixed time period. As such, FIG. 8 shows a query expansion 104 in which the time of the original query request is expanded so as to guarantee that at least one time-series data entry will be present in the expanded time period. Query expansion 104 may be executed by query machine 32 or query computing device 14, as nonlimiting examples.

The amount of expansion that is appropriate depends on the fixed time period 106 that is used and the time 108 of the last generation of synthetic times. In the illustrated example, the fixed time period is eight hours and synthetic times were last generated at 12:00:00 on Jun. 3, 2020. As such, expanding the query request to an expanded query request 110 that searches for time-synthesized values within a window 112 beginning the fixed time period before the lookup time and ending at the lookup time (e.g., the eight hour window 112 between 10:00:00 and 18:00:00) guarantees that at least one time-series data entry will be present for the tracked entity identified by ID value 111111A1. This expanded time can be used to constrain the portion of the database that is searched to window 112, thereby greatly increasing the efficiency of the search. If more than one result is found in the expanded window 112 (e.g., because the corresponding tracked entity moved locations), the results may be further analyzed to find the last entry before the lookup time.

In the illustrated scenario, synthetic times had been generated after the lookup time included in the query request (i.e., synthetic generation at 12:00:00 on Jun. 3, 2020 is after lookup time 18:00:00 on Jun. 2, 2020). As such, a query expansion of one fixed time period (i.e., eight hours) is sufficient to guarantee finding at least one time-series data entry in the searched window. If synthetic time generation is not up-to-date, the window can be increased to include at least one fixed time period prior to the last time the synthetic times were generated.

Turning back to FIG. 4B, at 416 method 400 includes returning query results (e.g., via database query machine 32 of database computing system 12). For example, returning to the example of FIG. 8, database query machine 32 of database computing system 12 responds to query 100 with query result 102, which specifies that the tracked entity corresponding to ID value 111111A1 was at location F11R24S74 at 18:00:00 on Jun. 2, 2020. Notably, only the entries within the expanded time period needed to be searched in order to find this answer. Without the synthesis described herein, a portion of the database with unknown size would need to be searched, which could substantially increase the search time and computational resources used to perform the search. While the example of FIG. 8 shows a query looking for one tracked entity at one particular time, it should be understood that searches may be performed for sets of different tracked entities and/or searches may look at one or more different times and or time ranges. Provided query expansion as exemplified in query expansion 104 is used for all queries, searching and analysis of query results may be performed to accurately and efficiently track exactly how any number of different tracked entities moves throughout time.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
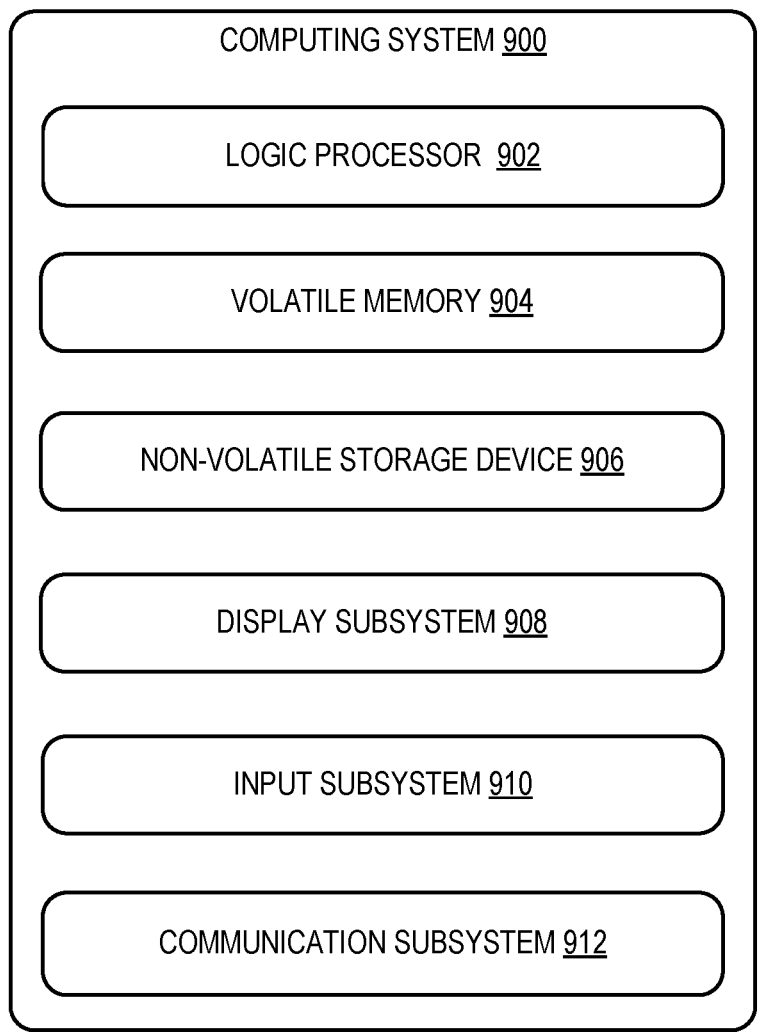
FIG. 9 schematically shows a computing system.

FIG. 9 schematically shows a non-limiting embodiment of a computing system 900 that can enact one or more of the methods and processes described above. Computing system 900 is shown in simplified form. The database computing system 12, replication system 16, query computing device 14, database preconditioning machine 30, database query machine 32, and/or time-series data sensors each may be different implementations of computing system 900, as nonlimiting examples. Computing system 900 may take the form of one or more personal computers, server computers, tablet computers, network computing devices, mobile computing devices, mobile communication devices (e.g., smartphone), and/or other computing devices.

Computing system 900 includes a logic processor 902, volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task (e.g., time-series data preconditioning), implement a data type, transform the state of one or more components, achieve a technical effect, or otherwise arrive at a desired result (e.g., normalize time-series data and/or synthesize time-series data).

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "process" may be used to describe an aspect of computing system 900 typically implemented in software by one or more processors to perform a particular function using portions of volatile memory, which function involves transformative processing that specially configures the processor to perform the function. Thus, a process may be instantiated via logic processor 902 executing instructions held by non-volatile storage device 906, using portions of volatile memory 904. It will be understood that different processes may be instantiated from the same application, service, code block, object, library, routine, API, function, etc. Likewise, the same processes may be instantiated by different applications, services, code blocks, objects, routines, APIs, functions, etc. The term "process" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, or touch screen.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A method of preconditioning time-series data for improved efficiency, comprising:
repeatedly recognizing new time series entries for each of a plurality of tracked entities;
for each of the plurality of tracked entities, promoting a new time-series data entry for the tracked entity responsive to the new time-series data entry including a changed value in a normalized field;
for each of the plurality of tracked entities, maintaining a previous time-series data entry for the tracked entity responsive to the new time-series data entry including an unchanged value in the normalized field; and
generating a synthetic time-series data entry for every tracked entity of the plurality of tracked entities without a time-series data entry in a fixed time period such that every tracked entity of the plurality of tracked entities has at least one corresponding time-series data entry for the fixed time period, wherein each synthetic time-series data entry includes the normalized field and a time-synthesized field, wherein the normalized field includes a value copied from a previous time-series data entry for the corresponding tracked entity entry in a prior fixed time period that occurred prior to the fixed time period, and wherein the time-synthesized field includes a time within the fixed time period.

2. The method of claim 1, wherein each new time-series data entry includes an ID value unique to the tracked entity in an ID field, a time-observed value in a time-observed field, and an observed value in the normalized field.

3. The method of claim 2, wherein the normalized field is a location field, and wherein the observed value is a location value.

4. The method of claim 3, wherein the ID value is encoded on an observable aspect of the tracked entity, the location value corresponds to a sensor location of a sensor observing the observable aspect, and the time-observed value corresponds to an observation time at which the sensor observes the observable aspect.

5. The method of claim 1, wherein each new time-series data entry includes an ID value unique to the tracked entity, and wherein the ID value is encoded on an observable Radio Frequency Identification (RFID) aspect of the tracked entity.

6. The method of claim 1, wherein promoting the new time-series data entry includes recording a same time value in a time-observed field and a time-synthesized field of the new time-series data entry.

7. The method of claim 1, further comprising receiving a query request including a lookup time, and returning query results having a time-observed value or a time-synthesized value within a window beginning the fixed time period before the lookup time and ending at the lookup time.

8. The method of claim 1, wherein a plurality of new time series data entries for different ones of the plurality of tracked entities are recognized over a tracking duration, and wherein the plurality of new time series data entries are retrospectively preconditioned as a batch.

9. The method of claim 8, wherein the tracking duration is one of:
greater than the fixed time period;
equal to the fixed time period; and
less than the fixed time period.

10. The method of claim 1, wherein a plurality of new time series entries for different ones of the plurality of tracked entities are recognized on-the-fly, and wherein the plurality of new time series entries are preconditioned on-the-fly as each of the plurality of new time series entries is recognized.

11. The method of claim 1, wherein maintaining the previous time-series data entry includes at least one of:
blocking promotion of the new time-series data entry for the tracked entity;
deleting the new time-series data entry for the tracked entity; and
replacing the previous time-series data entry with the new time-series data entry for the tracked entity.

12. A computing system, comprising:
one or more logic processors; and
a storage device holding instructions executable by the one or more logic processors to:
receive, from a sensor, a new time-series data entry for a tracked entity generated based on the sensor reading an observable Radio Frequency Identification (RFID) aspect of the tracked entity, wherein the tracked entity is one of a plurality of tracked entities, wherein the new time-series data entry includes an ID value unique to the tracked entity which is read from the RFID aspect of the tracked entity, a location value corresponding to a sensor location of the sensor reading the RFID aspect of the tracked entity, and a time-observed value corresponding to an observation time at which the sensor reads the RFID aspect of the tracked entity;
promote the new time-series data entry for the tracked entity responsive to the new time-series data entry including a changed location value;
maintain a previous time-series data entry for the tracked entity responsive to the new time-series data entry including an unchanged location value; and
generate a synthetic time-series data entry for every tracked entity without a time-series data entry in a fixed time period such that every tracked entity of the plurality of tracked entities has at least one time-series data entry for the fixed time period, the synthetic time-series data entry including an ID value for the tracked entity without the time-series data entry in the fixed time period, a location value copied from an immediately previous time-series data entry for the tracked entity without the time-series data entry in the fixed time period, and a time-synthesized value corresponding to a time in the fixed time period.

13. The computing system of claim 12, wherein the storage device holds instructions executable by the one or more logic processors to:
receive a query request including a lookup time, and
return a query result having a time-observed value or a time-synthesized value within a window beginning the fixed time period before the lookup time and ending at the lookup time.

14. The computing system of claim 12, wherein the storage device holds instructions executable by the one or more logic processors to retrospectively precondition a batch including a plurality of new time series entries output by a plurality of sensors over the course of a tracking duration.

15. The computing system of claim 14, wherein the tracking duration is one of:
greater than the fixed time period;
equal to the fixed time period; and
less than the fixed time period.

16. The computing system of claim 12, wherein promoting the new time-series data entry includes recording a same time value in a time-observed field and a time-synthesized field of the new time-series data entry.

17. A computing system, comprising:
one or more logic processors; and
a storage device holding instructions executable by the one or more logic processors to:
receive, from a sensor, a new time-series data entry for a tracked entity generated based on the sensor reading an observable Radio Frequency Identification (RFID) aspect of the tracked entity, wherein the tracked entity is one of a plurality of tracked entities, wherein the new time-series data entry includes an ID value unique to the tracked entity which is read from the RFID aspect of the tracked entity, a location value corresponding to a sensor location of the sensor reading the RFID aspect of the tracked entity, and a time-observed value corresponding to an observation time at which the sensor reads the RFID aspect of the tracked entity;
promote the new time-series data entry for the tracked entity responsive to the new time-series data entry including a changed location value;
maintain a previous time-series data entry for the tracked entity responsive to the new time-series data entry including an unchanged location value;
generate a synthetic time-series data entry for every tracked entity without a time-series data entry in a fixed time period such that every tracked entity of the plurality of tracked entities has at least one time-series data entry for the fixed time period, the synthetic time-series data entry including an ID value for the tracked entity without the time-series data entry in the fixed time period, a location value copied from an immediately previous time-series data entry for the tracked entity without the time-series data entry in the fixed time period, and a time-synthesized value corresponding to a time in the fixed time period;
receive a query request including a lookup time for the tracked entity, and
return a query result for the tracked entity having a time-observed value or a time-synthesized value within a window beginning the fixed time period before the lookup time and ending at the lookup time.

18. The computing system of claim 17, wherein the storage device holds instructions executable by the one or more logic processors to retrospectively precondition a batch including a plurality of new time series entries output by a plurality of sensors over the course of a tracking duration.

19. The computing system of claim 18, wherein the tracking duration is one of:
greater than the fixed time period;
equal to the fixed time period; and
less than the fixed time period.

20. The computing system of claim 17, wherein promoting the new time-series data entry includes recording a same time value in a time-observed field and a time-synthesized field of the new time-series data entry.

* * * * *